United States Patent [19]

Vogt et al.

[11] 4,072,631
[45] Feb. 7, 1978

[54] VANADYL ALCOHOLATE, ORGANIC TITANATE, POLYHYDRIC ALCOHOL COMPOSITIONS AS ESTERIFICATION/TRANSESTERIFICATION CATALYSTS

[75] Inventors: Herwart Curt Vogt, Grosse Ile; Manher Parekh, Woodhaven; Moses Cenker, Trenton; John Thomas Patton, Jr., Wyandotte, all of Mich.

[73] Assignee: BASF Wyandotte Corporation, Wyandotte, Mich.

[21] Appl. No.: 746,422

[22] Filed: Dec. 1, 1976

[51] Int. Cl.$^2$ .............................................. B01J 31/12
[52] U.S. Cl. .......................... 252/431 R; 260/75 R; 260/410.9 R; 260/410
[58] Field of Search ................. 252/431 R; 260/75 R, 260/410.9 D, 410.9 E, 410

[56] References Cited

U.S. PATENT DOCUMENTS

| | | | |
|---|---|---|---|
| 2,727,881 | 12/1955 | Caldwell et al. | 260/75 R |
| 3,047,515 | 7/1962 | Piirma | 260/75 R |
| 3,056,818 | 10/1962 | Werber | 260/410.9 D |
| 3,259,638 | 7/1966 | Allison | 252/431 R |
| 3,326,965 | 6/1967 | Schultheis et al. | 260/75 R |
| 3,453,241 | 7/1969 | Jeurissen et al. | 260/75 R |
| 3,567,653 | 2/1971 | Wagensommer et al. | 252/431 R |

*Primary Examiner*—Winston A. Douglas
*Assistant Examiner*—John F. Niebling
*Attorney, Agent, or Firm*—Norbert M. Lisicki; Bernhard R. Swick; Robert E. Dunn

[57] ABSTRACT

Compositions of vanadyl alcoholate, organic titanate and polyhydric alcohol compounds are effective esterification and transesterification catalysts.

4 Claims, No Drawings

VANADYL ALCOHOLATE, ORGANIC TITANATE, POLYHYDRIC ALCOHOL COMPOSITIONS AS ESTERIFICATION/TRANSESTERIFICATION CATALYSTS

BACKGROUND OF THE INVENTION

1. Field of the Invention.

This invention relates to the preparation of compositions by co-reacting a vanadyl alcoholate, an organic titanate and polyhydric alcohol compounds. More specifically, this invention relates to a process of preparing esters and polyesters in an improved manner by using theses novel compositions as esterification/transesterification catalysts.

2. Prior Art.

The preparation of esters and polyesters is well known in the art. These materials are prepared by esterifying mono- and/or polyhydric alcohols with mono- and/or polycarboxylic acids. In many instances it is desirable to prepare such esters or polyesters having a very low acid number, i.e., less than two, acid number being defined as the number of milligrams of KOH per gram of sample required to neutralize the acidity of the sample. However, the attainment of an ester or polyester having a low acid number is extremely difficult to achieve. For example, during the last stage of the esterification reaction, the reaction proceeds extremely slowly and hence in order to reduce the acid value it is necessary to heat for a lengthy period of time at relatively high temperatures. This, in many instances, tends to bring about formation of a darkened ester or polyester which is unsuitable for further use. Various attempts have been made to reduce the time of the esterification reaction. For instance, British Pat. No. 792,011 describes the use of iron, cadmium, cobalt, lead, zinc, antimony and manganese in the form of the metal, the metal oxide or the metal salt with a dibasic acid as catalysts which markedly reduce the esterification time. Organic titanium or organic zirconium compounds have been disclosed by U.S. Pat. No. 3,056,818 as being suitable as esterification catalysts. Titanium compounds are often insoluble in the product and must be removed by filtration or other tedious procedures. U.S. Pat. No. 3,716,670 teaches the use of a mixture of rhodium and vanadium compounds as catalysts for carboxylation or esterification. The technical literature also notes that esterification can also be effected by refluxing the acid and alcohol with a small amount of acid catalyst such as sulfuric acid, hydrochloric acid, and sulfonic acids or boron trifluoride. Acid catalysts of this type often cause undesirable side reactions resulting in color formation and must therefore be removed to insure a stable low acid number product.

Esters may also be prepared by a procedure known as a transesterification reaction. These transesterification reactions include the reaction between an ester and an alcohol to form a new ester and liberate an alcohol. Included also are the transesterification reactions where the components of the esters involved are polyhydroxy alcohols and polybasic acids. These reactions may, in some instances, be catalyzed by those substances which are employed for the esterification procedure. We have discovered that polyesters having an acid number less than two can be prepared in relatively short periods of time employing either esterification or transesterification procedures with the compositions of vanadyl alcoholates, organic titanates and polyhydric alcohol compounds as catalysts.

SUMMARY OF THE INVENTION

It has been discovered that certain unique combinations of vanadyl alcoholates, organic titanates and polyhydric alcohol compounds will result in esterification/transesterification catalysts which are more efficient than the individual metal compounds themselves. These compositions may be used for many types of mono- or polycarboxylic acid and anhydride to be esterified with any suitable hydroxyl containing material.

DESCRIPTION OF THE PREFERRED EMBODIMENTS

The compositions consist essentially of the reaction product of (A) an organic titanium compound having the formula:

$$Ti(OR)_4$$

wherein R is a radical selected from the group consisting of an aliphatic radical having from 1 to 18 carbon atoms, an alicyclic radical having between 1 and 3 rings, between 5 and 6 carbon atoms per ring, and between 5 and 18 carbon atoms per molecule, an aromatic radical having between 1 and 3 rings and between 6 and 18 carbon atoms per molecule with (B) a vanadyl alcoholate compound having the formula:

$$\overset{O}{\underset{}{\|}}V(OR)_3$$

wherein R is a radical selected from the group consisting of an aliphatic radical having from 1 to 18 carbon atoms, an alicyclic radical having between 5 and 6 carbon atoms, and a benzyl radical, and (C) a polyhydric alcohol containing 2 or 3 hydroxy groups selected from the group consisting of aliphatic, alicyclic, and aromatic polyhydric alcohols, and ether compounds of aliphatic and aromatic polyhydric alcohols.

The compositions of this invention are prepared by reacting together, under anhydrous conditions, and in the absence of air, at room temperature or elevated temperatures, the desired concentration of organic titanate, vanadyl alcoholate and the polyhydric alcohol. If desired to shorten reaction times, elevated temperatures and/or reduced pressures may be employed. The formation of these compositions is invariably accompanied by a color change. The preparation of these compositions may also be carried out in a suitable inert solvent to permit easier handling of the resulting catalyst. Solvents such as anhydrous xylene may be employed.

The organic titanates which can be employed include tetramethyl titanate, tetraethyl titanate, tetraallyl titanate, tetrapropyl titanate, tetraisopropyl titanate, tetrabutyl titanate, tetraisobutyl titanate, tetracyclohexyl titanate, tetrabenzyl titanate, and tetraethylhexyl titanate.

Mixed alkyl titanate compounds would include trimethylbutyl titanate, dimethyldibutyl titanate, triethylbutyl titanate and propyl tributyl titanate.

Included among the aromatic titanates are tetraphenyl titanate, o- and m-tetramethylphenyl titanate, and methyl triphenyl titanate.

The vanadyl alcoholates which can be employed include vanadyl methylate, vanadyl ethylate, vanadyl propylate, vanadyl isopropylate, vanadyl butylate, vanadyl isobutylate, vanadyl cyclopentylate, vanadyl hexylate, vanadyl cyclohexylate, vanadyl benzylate, and vanadyl ethylhexylate.

Mixed alcoholate vanadyl compounds include vanadyl dimethyl butylate, vanadyl dibutylmethylate, vanadyl diethylbutylate, vanadyl dibutylpropylate, vanadyl dicyclohexylethylate, vanadyl diisopropyloctadecylate, and vanadyl dibutyloctadecylate.

Included among the aromatic vanadyl compounds are vanadyl triphenylate, o- and m-vanadyl trimethylphenylate, and vanadyl diphenylpropylate.

Numerous polyhydric alcohols containing 2 to 3 hydroxyl groups may be employed in the preparation of the compositions in accordance with the present invention. The aliphatic polyhydric alcohols which may be employed include ethylene glycol, propylene glycol, 1,2-butanediol, 1,3-butanediol, 1,4-butanediol, 1,4-pentanediol, 1,5-pentanediol, 1,6-hexanediol, 1,7-heptanediol, 1,2,6-hexanetriol, neopentyl glycol, glycerol, trimethylolpropane, triethylolpropane, and 1,10-decanediol. Also included are either compounds of aliphatic polyhydric alcohols. Representative of such compounds are diethylene glycol, dipropylene glycol, triethylene glycol, tripropylene glycol, tetraethylene glycol, tetrapropylene glycol. Aromatic polyhydric alcohols may also be employed such as 1,4-bis hydroxymethylbenzene. Alicyclic polyhydric alcohols are included. Representative of these are 2,2-bis (4-hydroxy cyclohexyl) propane, 1,4-bis hydroxymethyl cyclohexane, and 1,4-cyclohexanediol. Ether compounds of aromatic polyhydric alcohols may also be employed. A typical compound of these is hydroquinone di($\beta$-hydroxyethyl)ether.

The above list is merely representative of the many polyhydric alcohols which may be employed in the present invention. The only requirement is that the compound contain 2 or 3 hydroxyl groups.

Mixtures of any of the above may be employed.

The concentrations of the compositions which may be employed as a catalyst in the preparation of ester or polyester polyols can be varied over a fairly wide range. Small amounts such as 0.00005 mole of the composition ($5 \times 10^{-5}$) per 1000 grams of ester or polyester have been successfully employed and amounts as high as 0.01 mole of the composition ($1 \times 10^{-2}$) per 1000 grams of ester or polyester or higher can be used. Preferably, amounts less than 0.0005 mole of the composition per 1000 grams of ester or polyester ($5 \times 10^{-4}$) are employed. The presence of large quantities may result in the presence of an unwanted impurity depending upon the future use of the ester or polyester polyol. The composition may be initially introduced with the material to be esterified, or it may be introduced at the time when the esterification reaction has slowed down and the acid number has reached a value of about 15–20. Reaction conditions under which esterification is effected can be varied considerably. The reaction generally proceeds very slowly at room temperature but at elevated temperatures, the reaction rate is quite rapid so that about 85–95 percent of the acid is converted to ester within a few hours. To force the equilibrium towards the formation of the product the water of esterification is removed as rapidly as it forms. One accepted way this can be accomplished is by carrying out the reaction in a liquid medium which forms an azeotrope with water having a boiling point that is lower than that of either component of the reaction. It is to be understood, however, that if the reactants and the esters which result, boil at temperatures well above 100° Centigrade at atmospheric pressure, the reaction temperature can be sufficiently high and would not require azeotrope forming liquid reaction medium. Generally, temperatures of 150°–240° Centigrade are employed. The reaction can be carried out under reduced or superimposed pressures. To facilitate water removal at the later stages of esterification, a pressure of 0.1–100 mm Hg is often employed. The time of reaction will depend on the reactivity of the reactants, the stoichiometry, temperature, and pressure employed in the reaction, the molecular weight of the resulting polyester, the rapidity with which the water of esterification is removed, and the activity of the catalyst composition employed.

Any mono- or polycarboxylic acid and anhydrides thereof may be employed for the preparation of esters. Thus, the acids undergoing esterification can be aliphatic, cycloaliphatic or aromatic and they can be substituted or unsubstituted. Among the acids which may be employed include acetic, acrylic, isobutyric, n-butyric, pivalic, isovaleric, chloroacetic, caproic, bromoacetic, heptanoic, hexahydrobenzoic, undecanoic, mesitylenic, tartaric, 3,5-dinitrosalicylic, p-toluic, p-fluorobenzoic, $\beta$-naphthoic, succinic, fumaric, phthalic, tetrachlorophthalic, isophthalic, terephthalic, benzoic, maleic, 2,5-dimethylbenzoic, sebacic, acetylsalicylic, phenylpropiolic, 2,6-dichlorobenzoic, o-chlorobenzoic, m-nitrobenzoic, adipic, citric, salicylic, oleic, methacrylic, lactic, capric, lauric, myristic, stearic, phenylacetic, glycolic, glutaric, o-toluic, m-toluic, malonic, glutaconic, and 1,4-cyclohexane dicarboxylic.

Anhydrides of polybasic acids can be used in place of the acids. These include such compounds as maleic anhydride, succinic anhydride, phthalic anhydride, camphoric anhydride, 2,3-naphthalic anhydride and 3,3',4,4'-benzophenone tetracarboxylic anhydride.

Among the monohydric and polyhydric alcohols which can be reacted with carboxylic acids and anhydrides include methyl alcohol, ethyl alcohol, isopropyl alcohol, allyl alcohol, isobutyl alcohol, n-butyl alcohol, sec-amyl alcohol, ethylene glycol monomethyl ether, 1-chloro-2-propanol, ethylene chlorohydrin, 4-methyl-2-pentanol, ethylene glycol monoethyl ether, n-amyl alcohol, cyclopentanol, 2-ethyl-1-butanol, 2-bromoethanol, 2-ethylhexanol, n-hexyl alcohol, 2-methylcyclohexanol, furfuryl alcohol, cyclohexanol, lauryl alcohol, sorbitol, triphenylcarbinol, mannitol, pentaerythritol, n-heptyl alcohol, tetrahydrofurfuryl alcohol, ethylene glycol, diethylene glycol monoethyl ether, benzyl alcohol, glycerol, dipropylene glycol, triethylene glycol, 1,4-butanediol, 1,5-pentanediol, 1,6-hexanediol, 1,1,1-trimethylolpropane, 1,1-trimethylolethane, hexane-1,2,6-triol, neopentyl glycol and 1,10-decanediol.

The following Examples are provided to further illustrate the invention. In these Examples the compounds designated by letters A, B, C, D, E, F, G and H are as follows:

Compound A is tetrabutyl titanate.
Compound B is tetraisopropyl titanate.
Compound C is vanadyl isopropylate.
Compound D is vanadyl isobutylate.
Compound E is diethylene glycol,
Compound F is 1,4-butanediol.
Compound G is hydroquinone di($\beta$-hydroxyethyl)ether.
Compound H is 1,4-cyclohexanediol.

The designations B+C+E, A+D+H, etc., indicate the mixtures of the respective compounds employed to form the catalyst composition. Parts and percents are by weight unless otherwise indicated.

EXAMPLES 1-5

In an insulated 100 milliliter 3-necked flask connected with a mechanical stirrer, nitrogen inlet tube, thermometer and a 12 glass helix packed column with a distillation take-off head, the tabulated quantities of organic titanate, vanadyl alcoholate and polyhydric alcohol were added to the reaction flask. The reactants were heated to 50° to 120° C. at a reduced pressure of less than 50 mm mercury and isopropyl alcohol or isobutyl alcohol were removed depending on the type of alcoholate employed. The resulting compositions are tabulated below in Table I. The found carbon and hydrogen contents of the resulting products are also tabulated therein.

Table I

| Ex. No. | Composition | Moles | Grams | % Carbon Found | % Hydrogen Found | Physical Appearance |
|---|---|---|---|---|---|---|
| 1 | B | 0.05 | 14.2 | | | |
|   | + |  |  |  |  |  |
|   | C | 0.05 | 12.2 | | | |
|   | + |  |  |  |  |  |
|   | E | 0.05 | 5.30 | 44.6 | 8.6 | Yellow liquid |
| 2 | B | 0.05 | 14.2 | | | |
|   | + |  |  |  |  |  |
|   | C | 0.05 | 12.2 | | | |
|   | + |  |  |  |  |  |
|   | F | 0.05 | 4.50 | 44.5 | 8.5 | Green liquid |
| 3 | A | 0.06 | 20.4 | | | |
|   | + |  |  |  |  |  |
|   | C | 0.06 | 14.6 | | | |
|   | + |  |  |  |  |  |
|   | G | 0.06 | 11.9 | 44.9 | 6.9 | Brown solid |
| 4 | A | 0.05 | 17.0 | | | |
|   | + |  |  |  |  |  |
|   | D | 0.05 | 14.3 | | | |
|   | + |  |  |  |  |  |
|   | H | 0.05 | 5.80 | 50.4 | 9.3 | Green liquid |
| 5 | A | 0.05 | 17.0 | | | |
|   | + |  |  |  |  |  |
|   | D | 0.05 | 14.3 | | | |
|   | + |  |  |  |  |  |
|   | F | 0.05 | 4.5 | 50.2 | 9.2 | Yellow liquid |

EXAMPLES 6-13

The polyester employed in the Examples below was prepared by the following procedure:

Into a 22-liter, four-necked, round bottom reaction vessel, equipped with stirrer, thermometer, distillation head, glass helix packed column, vacuum take-off tube, nitrogen gas sparge tube, and heater, 1,4-butanediol (3225 g. = 35.8 moles), ethylene glycol (2226 g. = 35.8 moles) and adipic acid (9549 g. = 65.4 moles) were added. The reaction mixture was gradually heated to 170°-180° Centigrade with the water of reaction being removed continually. When the rate of water removal slowed down, the reaction temperature was increased to 225° ±5° Centigrade and vacuum was slowly and carefully applied until a vaccum of 10 mm Hg was reached. The reaction was stopped when the polyester mixture had an acid number of 17.50. The polyester was stored and used as a master batch for investigation of the catalytic effect of various compositions on the acid numbers of this polyester in Examples 6-13.

The polyester, 1160 grams, was transferred to a two-liter, round bottom reaction flask, equipped with stirrer, thermometer, vacuum pump, condenser, nitrogen gas sparge tube and heater. The polyester was then heated to 225° ±5° Centigrade and a sample removed to determine the initial acid number. The indicated composition was then added and the polyester mixture was allowed to react for one hour. The acid number was checked and additional composition added as indicated. The mixture was then reacted for an additional hour and the final acid number was then determined. The results in Table II illustrate that the compositions are considerably more reactive than the individual compounds as indicated by the concentration of the composition required to achieve the final acid number of less than one. The variations in the initial acid number are due to a variation in the time of heating the individual polyester mixture prior to addition of the various compositions. The various compositions were prepared employing equimolar concentrations of the individual compounds indicated in Table II.

Table II

| | Examples | | | | | | | |
|---|---|---|---|---|---|---|---|---|
| | 6 | 7 | 8 | 9 | 10 | 11 | 12 | 13 |
| Catalyst Composition | C | B+C+E | B+C+F | A+D+H | A+C+F | A | B | D |
| Initial Acid Number | 15.5 | 13.2 | 9.8 | 12.1 | 10.2 | 15.5 | 17.1 | 14.4 |
| Amount of Catalyst 1st Addition, gms. | 0.03 | 0.03 | 0.03 | 0.03 | 0.03 | 0.03 | 0.03 | 0.03 |
| Acid Number after 1 Hour | 8.53 | 1.00 | 0.95 | 0.29 | 1.12 | 1.17 | 0.97 | 7.27 |
| Amount of Catalyst 2nd Addition, gms. | 0.03 | 0.03 | 0.03 | — | 0.03 | 0.03 | 0.03 | 0.03 |
| Acid Number after 2 Hours | 4.41 | 0.5 | 0.33 | 0.29 | 0.26 | 0.29 | 0.26 | 5.31 |
| (Total Moles of Catalyst, 1000 gms. of Ester) $\times 10^{-4}$ | 2.1 | 1.0 | 1.04 | 0.58 | 0.91 | 1.5 | 1.8 | 1.8 |

EXAMPLES 14-18

The products of Examples 14-18 were prepared in a one-liter, three-necked flask equipped with a condenser, thermometer, glass helix packed column, nitrogen gas sparge tube, stirrer and Dean-Starke tube. The flask was charged with 390 grams of 2-ethyl hexanol, 148 grams of phthalic anhydride and 2 grams of the catalyst composition as designated below in Table III. The reaction was conducted at a temperature of 205° ±5° C. The progress of the reaction was determined by measuring the water collected in the Dean-Starke tube. Upon collecting 18 grams of water the reaction was considered to have been completed.

Table III

| | Examples | | | | |
|---|---|---|---|---|---|
| | 14 | 15 | 16 | 17 | 18 |
| Catalyst | D | C | A | B | A+D+H |
| (Moles of catalyst 1000 polyester) $\times 10^{-4}$ | 179 | 210 | 150 | 181 | 86 |
| Time required for | | | | | |

Table III-continued

| | Examples | | | | |
|---|---|---|---|---|---|
| | 14 | 15 | 16 | 17 | 18 |
| 100% Reaction, minutes | 480 | 510 | 192 | 175 | 135 |

The embodiments of the invention in which an exclusive property or privilege is claimed are defined as follows:

1. A composition consisting essentially of the reaction product of (A) an organic titanium compound having the formula:

$$Ti(OR)_4$$

wherein R is a radical selected from the group consisting of an aliphatic radical having from 1 to 18 carbon atoms, an alicyclic radical having between 1 and 3 rings, between 5 and 6 carbon atoms per ring, and between 5 and 18 carbon atoms per molecule, an aromatic radical having between 1 and 3 rings and between 6 and 18 carbon atoms per molecule with (B) a vanadyl alcoholate compound having the formula:

wherein R is a radical selected from the group consisting of an aliphatic radical having from 1 to 18 carbon atoms, an alicyclic radical having between 5 and 6 carbon atoms, and a benzyl radical, and (C) a polyhydric alcohol containing 2 or 3 hydroxy groups selected from the group consisting of aliphatic, alicyclic, and aromatic polyhydric alcohols, and ether compounds of aliphatic and aromatic polyhydric alcohols wherein the mole ratio of the titanium compound to the vanadyl compound to the polyhydric alcohol compound is 1:1:1.

2. The composition of claim 1 wherein the titanium compound is selected from the group consisting of tetraisopropyl titanate and tetrabutyl titanate.

3. The composition of claim 1 wherein the vanadium compound is selected from the group consisting of vanadyl isopropylate and vanadyl isobutylate.

4. The composition of claim 1 wherein the polyhydric alcohol compound is selected from the group consisting of ethylene glycol, diethylene glycol, dipropylene glycol, 1,4-butanediol, 1,4-cyclohexanediol, and hydroquinone di(β-hydroxyethyl)ether.